March 25, 1969 J. UERLICHS 3,434,499
SLIDE VALVE PLATE WITH A RELIEF DEVICE PARTICULARLY FOR
SLIDE VALVES OF LARGE SIZE
Filed May 1, 1967

INVENTOR.
JOHANNES UERLICHS

BY

ATTORNEYS

United States Patent Office
3,434,499
Patented Mar. 25, 1969

3,434,499
SLIDE VALVE PLATE WITH A RELIEF DEVICE PARTICULARLY FOR SLIDE VALVES OF LARGE SIZE
Johannes Uerlichs, Duren-Birkesdorf, Germany, assignor to Rappold & Co. G.m.b.H., Duren-Birkesdorf, Germany
Filed May 1, 1967, Ser. No. 634,933
Claims priority, application Germany, June 23, 1966,
R 43,527
Int. Cl. F16k 3/32
U.S. Cl. 137—630.12      6 Claims

ABSTRACT OF THE DISCLOSURE

A slide valve plate particularly for plates of large diameter wherein a bottom plate is provided with a relief opening and an arched part cooperates with said bottom plate having at its circumference a sealing surface. Strengthening ribs are positioned between the bottom plate and the arched part. A relief valve plate cooperates with the relief opening and is operated by the actuation rod for the slide valve. An inset is provided at the relief opening for the sealing setting for the relief plate which may be easily removable and the arched part is provided with an opening for the actuating rod for the valve.

This invention relates to a slide valve plate having a slidable relief plate designed especially for plates of larger than the usual width.

Slide valves, whose plates are provided with a relief device are mainly used in cases when relatively large conduit cross sections are involved and the pressures on a slide plate require so much power to put the plate into movement that the drive capacity necessary for the further progress of the opening of the valve is far exceeded. In such a case a relief device is opened which in most cases is in an effective connection with the slide drive, so that a pressure compensation takes place in front of and behind the slide valve, which then may be opened under a normal drive capacity and without any difficulties. It is an object to improve such constructions.

A further object is to provide a plate having a plate-like arched part provided at its circumference with a sealing surface and within such arched part with strengthening ribs or serrations as well as with a relief opening controlled by a relief sliding plate operated by the control rod for the slide valve. Such a development operates very satisfactorily for pressures up to about 1.5 atmospheric excess pressure, for instance with flue gas or cold blast valves. But it is not practicable for use in cold blast flues of modern blast furnace facilities, where one works nowadays with a blast pressure up to 4 atmospheres excess pressure, since the reliability of operation and especially the sealing capacity leave much to be desired. The cause of this is, when one keeps the thickness measurements within practical constructional limits, a weakening of the center part of the slide plate by the relief opening is effected, so that despite any strengthening serrations provided bendings occur which result in porosity of the smaller relief valve plates as well as of the seating of the larger slide plates. A further disadvantage of the known construction lies in the fact that the grinding and regrinding of the sealing seatings of the large relief valve plate has to be accomplished manually. A further object is to eliminate such disadvantages.

A still further object according to the present invention lies in an improvement of the stability and sealing capacity of the relief valve plate in a simple and easy construction which is also safe for a modern blast furnace operation, and further to render more easy the working of the sealing seatings of the relief device. This is obtained according to the present invention in that the open side of the arched slide plate part and the strengthening serrations are bridged by a bottom provided with a relief opening and within the relief opening the counter sealing seating for the relief slide plate within the bottom is arranged in the form of a replaceable insertion being of larger dimension on the exterior, while the arched part is provided with at least one opening for the actuation member of the relief slide plate. In this way one obtains for the slide plate a hollow profile casing smooth on the exterior and especially suited for relatively high capacities which satisfies the requirement for a high stability with a light construction to a high degree and besides encloses and protects the relief devices.

A further object is to provide a replaceable arrangement of the relief slide plate and its counter sealing seating so that the sealing surfaces may be ground independently of the large relief plate, which simplifies this procedure considerably.

A still further object is to provide a counter sealing surface of the relief slide plate at the front side of a cylindrical added piece of a flange which is embedded and screwed with the added piece into the bottom of the slide plate. Thereby, suitably at the side of the sealing surfaces of the flange, fish plates with movable rolls are arranged, diametrically opposed to the course of the movement of the relief plate, penetrating through corresponding recesses of the bottom, which cooperate in the pressing together of the sealing surfaces with oblique surfaces of the relief plate.

A further object, when forming the slide plate as a welded construction one may proceed according to the present invention in using a circular piece of pipe which supports on its one front side the sealing surface of the slide plate, while within the range of the other front side of the level bottom with the strengthening serrations is welded into and the arched part welded onto, whereby the strengthening serrations may be arranged around the course of movement of the relief valve plate as well as in a radial direction.

With the above and other objects in view which will become apparent from the detailed description below, a preferred embodiment of the invention is shown in the drawings in which.

Figures 1, 2:
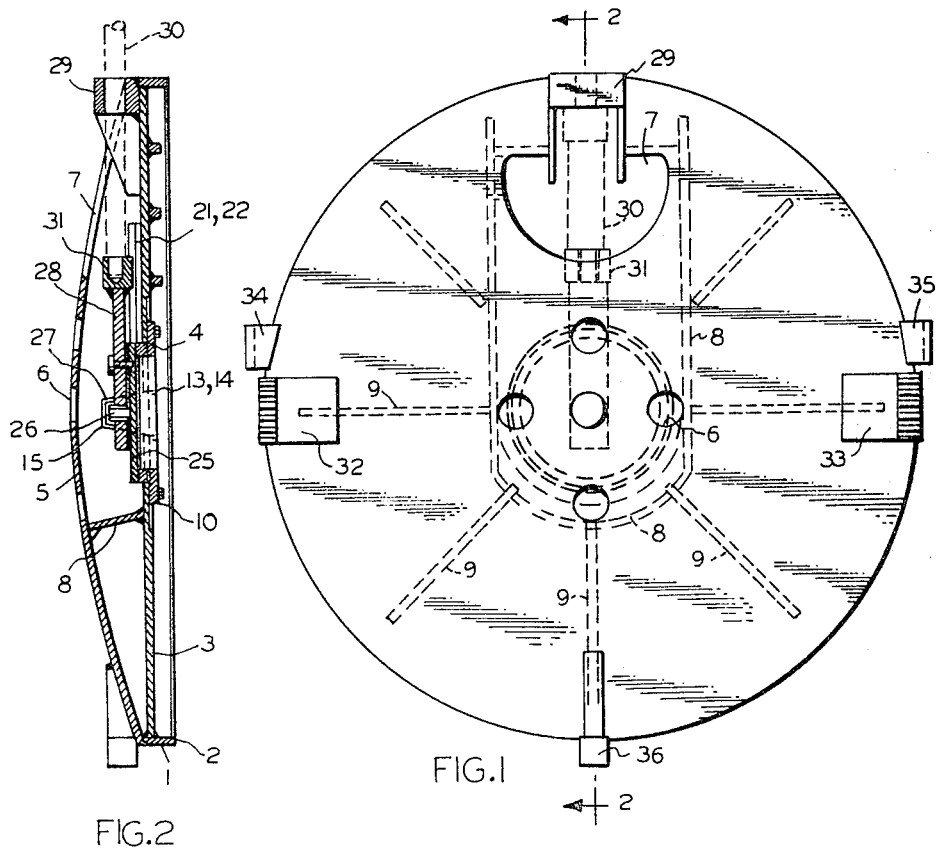
FIG. 1 is a top view of a slide valve plate.
FIG. 2 is a cross section along line 2—2 of FIG. 1.
Figure 3:
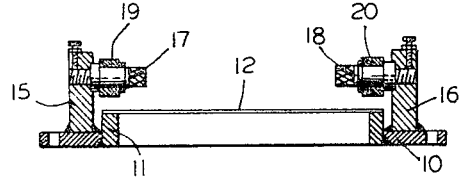
FIG. 3 illustrates the counter sealing of the relief valve plate on a larger scale in cross section.

In the drawing, the slide plate is provided with a circular pipe section 1 which at one end supports the slide plate sealing surface 2 cooperating with the casing sealing surface (not shown) and into the other end a level bottom 3 is welded with a central opening 4. Furthermore, on this end of pipe section 1, that is at the free front side a part 5 is welded which is arched towards the outside and provided at its center with bores 6 and adjacent its circumference with a larger opening 7.

Between the bottom 3 and the arched part 5 are the strengthening ribs or serrations and the ribs 8 surround and are spaced from the bottom opening 4 horseshoe-like and surround with the ends of the shanks the circumferential opening 7 of the arched part. From the horseshoe-like arranged strengthening serrations 8 extend also strengthening serrations 9 radially away towards the perimeter.

Figure 4:
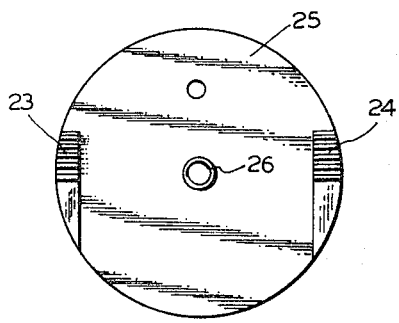
FIG. 4 is a top view of the relief valve plate on the scale of FIG. 3.

At the bottom opening 4 a flange 10 is fixed and is fastened detachably by means of screws. The flange 10 supports a ring 11 fitted in the opening 4 having a sealing surface 12 and at the side of the sealing surface fish plates 15 and 16 fitted through recesses 13 and 14 of the bottom 3. Bolts 17 and 18 having rotatable rolls 19 and 20 are arranged on fish plates 15 and 16. Recesses 13 and 14 are positioned diametrically opposite each other on the opening of the bottom and the fish plates 15 and 16 as well as the plane sides of rolls 19 and 20 are positioned parallel to the shanks of the horseshoe-like strengthening serrations 8. Also in the same direction extending away from the fish plates 15 and 16 along the bottom 3 are fixed the rails 21 and 22 which form with rolls 19 and 20 the guiding means for the relief valve plate 25 cooperating with the sealing surface 12 and being provided with roller receiving surfaces 23 and 24, see FIG. 4. Within the center of this plate a bolt 26 is arranged which serves for receiving a bearing lug 27 of a member 28 which is connected to actuation rod 30 for the relief valve plate 25 via a threaded head 31 and which is guided in a bearing 29 fixed to bottom 3.

Reference characters 32 to 35 identify means by which the slide plate is guided in the slide valve casing (not shown), and reference character 36 indicates a slide valve stop.

When opening the slide valve, e.g. during acceleration of the slide valve plate, first of all the relief valve plate 25 is moved from opening 4, until the threaded head 31 of the connecting member 28 abuts the bearing 29 of the slide valve plate and then during the further course of acceleration the slide valve plate is moved along. The locking procedure is accomplished by the oblique surfaces 23 and 24 of the relief valve plate 25 and the rolls 19 and 20 slide thereon until a tight position is obtained.

It is thought that the invention and its material advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:
1. A slide valve plate especially for slide valve plates of large diameter comprising a bottom plate having a relief opening, a plate-like arched part on said slide valve plate having at its circumference a sealing surface, strengthening ribs located between said bottom plate and said arched part, an actuation rod for said slide valve plate, a relief valve plate for said relief opening mounted on said rod, said relief opening bridging the open side of said arched part and said strengthening ribs and a displaceable inset piece having a counter sealing seating surface for said relief valve plate arranged within said bottom plate.

2. A slide valve plate as set forth in claim 1 wherein said arched part has a recess through which said actuation rod extends to said relief valve plate.

3. A slide valve plate as set forth in claim 1 wherein said inset piece comprises a flange secured to said bottom plate and a cylindrical element fixed to said flange fitted from the exterior into said relief opening.

4. A slide valve plate as set forth in claim 3 wherein diametrically mounted fish plates are secured to said flange having movable rolls to cooperate with said relief valve plate in pressing together the sealing surfaces.

5. A slide valve plate as set forth in claim 4 wherein said relief valve plate is provided with oblique surfaces which cooperate with said movable rolls.

6. A slide valve plate as set forth in claim 1 wherein said strengthening ribs are secured by welds to said bottom plate and said arched part is secured by welds to said ribs, said ribs extending around the course of movement of said relief valve plate and also in a radial direction.

References Cited
UNITED STATES PATENTS

| | | | |
|---|---|---|---|
| 434,796 | 8/1890 | Leslie | 137—630.12 X |
| 2,879,799 | 3/1959 | Jansen | 137—630.12 |
| 3,258,243 | 6/1966 | Bryant | 251—203 X |
| 3,382,895 | 5/1968 | McCullough | 137—630.15 |

CLARENCE R. GORDON, *Primary Examiner.*

U.S. Cl. X.R.

137—630.15; 251—203